United States Patent Office 3,534,557
Patented Oct. 20, 1970

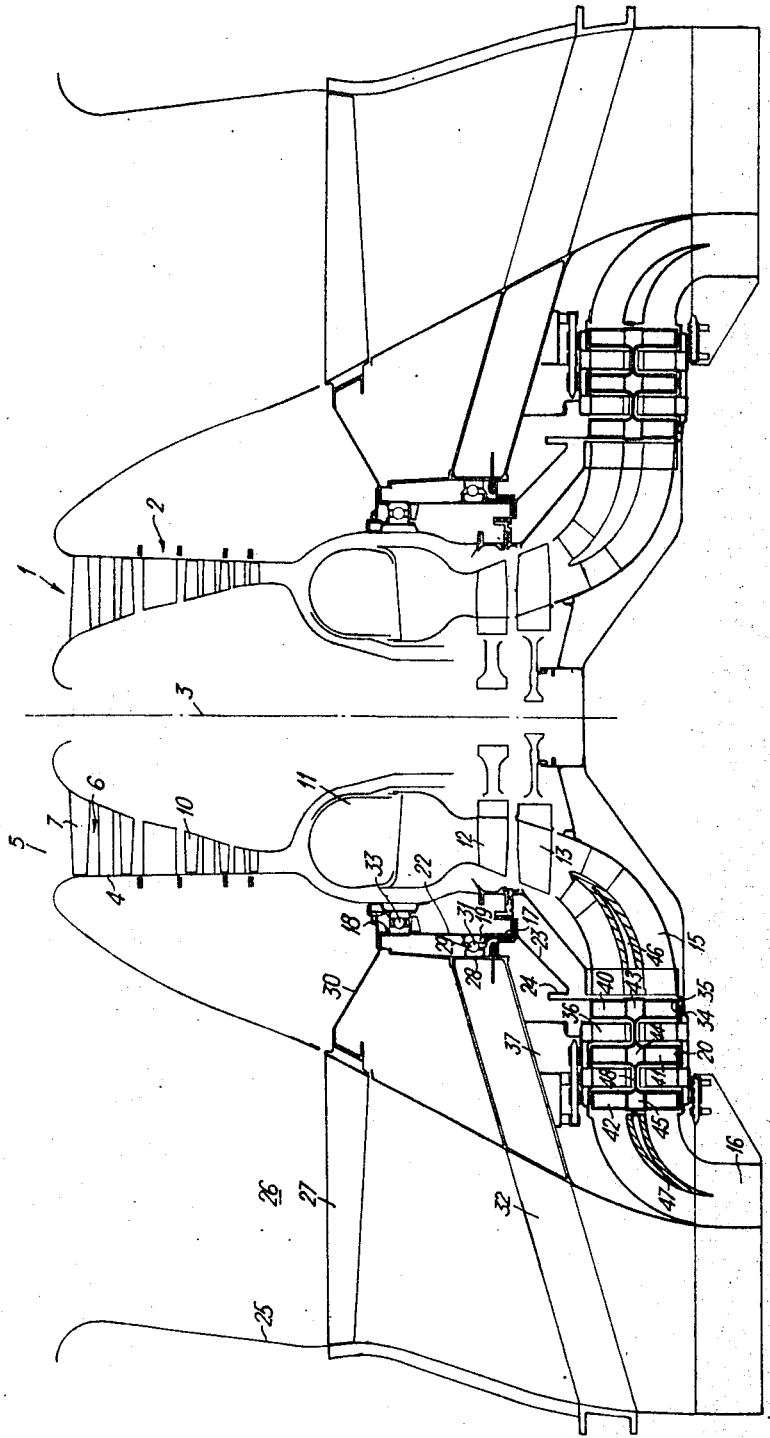

3,534,557
ROTARY BLADED FLUID FLOW MACHINE, E.G. A FAN LIFT ENGINE
James Alexander Petrie, Derby, Charles William Robey, Kings Newton, and Dennis George Adkin, Derby, England, assignors to Rolls-Royce Limited, Derby, England, a British company
Filed Sept. 17, 1968, Ser. No. 760,215
Claims priority, application Great Britain, Oct. 6, 1967, 45,825/67
Int. Cl. F02k 3/04; F04d 29/04
U.S. Cl. 60—226          15 Claims

ABSTRACT OF THE DISCLOSURE

A gas turbine engine has a cylindrical fixed outer casing, and an axially extending rotatable shaft which is disposed within and spaced from the fixed outer casing. The shaft is mounted within and supported by a first bearing which is carried by radially extending struts secured to the outer casing. Second bearings are provided and are mounted within the shaft and have mounted therein the gas turbine engine. The second bearings allow for relative rotation between the shaft and the gas turbine engine.

---

This invention concerns a rotary bladed fluid flow machine such, for example, as a fan lift engine.

The term "lift engine" as used in this specification is intended to indicate an engine adapted to produce vertical lift forces on an aircraft independently of those generated aerodynamically by forward flight of the aircraft.

According to the present invention, there is provided a rotary bladed fluid flow machine having a substantially cylindrical fixed outer casing, a substantially axially extending rotatable shaft which is disposed within and spaced from the fixed outer casing, the shaft being mounted within and supported by first bearing means which are carried by substantially radially extending struts secured to the outer casing, there being second bearing means which are mounted within the shaft and within which a fluid flow device is mounted and supported, the second bearing means providing for relative rotation between the shaft and the said device, and means connected to the outer casing for preventing rotation of the said fluid flow device.

Thus, the said fluid flow device is supported from the said substantially radially extending struts by way of the two said bearing means and shaft, and it is not necessary, as would otherwise be the case, to provide a sturdy cylindrical casing within which to mount the fluid flow device, nor is it necessary to provide axially extending members between such a sturdy cylindrical casing and the substantially radial struts. Thus the present invention enables the weight of the fluid flow machine to be substantially reduced.

The means for preventing rotation may be connected to the outer casing by being connected to the said struts.

The said fluid flow device is preferably constituted by a gas turbine device which drives the said shaft. Thus the said outer casing may form the outer casing of a fan duct, there being mounted within the fan duct a fan which is driven by the said shaft.

For example, the gas turbine device may comprise a radially extending turbine which drives the said shaft. Such a radially extending turbine is preferably a free turbine, the gas turbine device comprising a gas generator whose gases drive the free turbine.

The means for preventing rotation may comprise interengaging dogs which are respectively provided on a part of the gas turbine device and on means connected to said struts. Thus the means connected to the struts may comprise the stator part of the said radially extending turbine.

The free turbine preferably comprises a row of rotor blades which extend axially from opposite sides of a central ring member which is arranged coaxially of the gas generator, the central ring member having a drive connection to the said shaft to drive the latter and being supported solely thereby.

There may be at least one further row of rotor blades, the blades of the or each said row extending from a said central ring member, the central ring members of all the said rows being interconnected.

The said drive connection is preferably a radially flexible connection such, for example, as a "hairpin" connection.

Fairings may be mounted on opposite sides respectively of the said row or rows, the fairings guiding fluid flowing through the gas turbine device onto or from the blades so as to diminish the effect of the obstruction caused by the or each central ring member.

The fairings may, for example, carry sound damping material, and at least one of the fairings may extend through a curved duct portion of the gas turbine device and may help to guide the fluid smoothly therethrough.

According to another aspect of the present invention, there is provided a fluid flow machine having a substantially cylindrical fixed outer casing, substantially axially extending rotatable shafting which is disposed within and spaced from the fixed outer casing, and rows of blades which are respectively drivingly connected to opposite end portions of the shafting, the shafting being mounted within and supported solely by a single bearing which is itself supported from the outer casing.

The invention is illustrated, merely by way of example, in the accompanying drawing, which is a sectional view of a fan lift engine in accordance with the present invention.

Referring to the drawing, a fan lift engine 1 includes a gas turbine gas generator 2 arranged about a vertical axis 3. The gas generator 2 has a casing 4 at whose upper end there is an air inlet 5. The casing 4 forms the outer wall of an annular flow duct 6 within which there are arranged in flow series a low pressure compressor 7, a high pressure compressor 10, combustion equipment 11, a high pressure turbine 12 and a low pressure turbine 13.

Downstream of the low pressure turbine 13 the flow duct 6 has a curved duct portion 15 a part of which extends substantially radially, the duct portion 15 merging into a curved duct portion 16 a part of which extends axially to the downstream end of the flow duct 6.

Mounted in the radially extending part of the duct portion 15 is a free turbine 20. The free turbine 20, which is described in greater detail below, and which is thus driven by the exhaust gases of the gas turbine gas generator 2, drives a rotatable shaft 22 by way of drive connecting structure 23 having a radially flexible "hairpin" section 24, the drive connecting structure 23 being drivingly connected to the lower end portion 17 of the shaft 22. The shaft 22 extends parallel to the axis 3, i.e. axially of the engine 1.

The engine 1 has a substantially cylindrical fixed outer casing 25 which forms the outer casing of a fan duct 26. Mounted within the fan duct 26 is a fan 27 which is driven by the axially extending rotatable shaft 22 by way of frusto-conical structure 30, the frusto-conical structure 30 being drivingly connected to the upper end portion 18 of the shaft 22.

As will be seen from the drawing, the shaft 22 is disposed in the space between the annular flow duct 6 and the fan duct 26. The shaft 22, which is thus disposed radially inwardly of and spaced from the outer casing 25, is supported from the latter solely by virtue of being mounted within and supported by an inner race 19 of a bearing 31. The bearing 31 has an outer race 28 which is spaced from the inner race 19 by balls 29 which are in rolling contact with the races 19, 28, the outer race 28 being itself carried by substantially radially extending struts 32 secured to the outer casing 25. The struts 32, which are disposed between the fan 27 and the free turbine 20, are not necessarily disposed perfectly radially but may, for example, as shown extend from the outer casing 25 in a direction towards the air inlet 5 of the engine 1.

The bearing 31 is disposed outwardly of and adjacent the lower end portion 17 of the shaft 22, the bearing 31 being disposed in a plane which contains the centre of gravity of the combined fan 27 and gas generator 2, shaft 22 and free turbine 20. A bearing 33 is mounted within the shaft 22 adjacent the upper end portion 18 thereof, the bearing 33 being disposed in a plane containing the centre of gravity of the gas generator 2. The casing 4 of the gas turbine gas generator 2 is mounted within the bearing 33 and is supported thereby, the bearing 33 providing for relative rotation between the shaft 22 and the gas turbine gas generator 2.

In order to prevent actual rotation of the gas turbine gas generator 2, the latter is provided with dogs 34 which engage with dogs 35 on a stator part 36 of the free turbine 20, the stator part 36 being connected by structure 37 to the struts 32. The dogs 34, 35 need only provide a relatively light restraint of the gas turbine gas generator 2. Accordingly, the dogs 34 and 35 can be of any construction which is well known to this art and to the art of restraining movement between two assemblies. Thus the gas turbine gas generator 2 is prevented from rotating by being connected via the dogs 34, 35, the stator part 36, the structure 37 and the struts 32, to the fixed outer casing 25.

As will be appreciated, the mounting of the gas turbine gas generator 2 in the manner described above is very much lighter than the alternative of mounting the gas generator within a sturdy cylindrical structure which would be supported from the outer casing both by the struts 32 and by axially extending members extending from said struts.

Thus the shaft 22, within which the gas generator 2 is mounted, is itself supported *solely* by the *single* bearing 31. This is possible because the bearing 31 is of exceptionally large diameter when compared, for instance, with the bearings (not shown) of the high and low pressure shafts (not shown) of the gas generator 2. Therefore any small clearances in the bearing 31 would permit only very slight pivotal movement of the shaft 22, and even these small clearances are taken up when the fan 27 is running by the large aerodynamic axial load imparted by the fan 27 to the shaft 22.

Normally is would be impossible to use such a large diameter bearing 31 because, as the bearing diameter increases, so the tracking speed of the balls 29 of the bearing also increases for any given rotational speed of the shaft. In the present case, however, in order to reduce noise, the speed of the fan 27 is kept low and therefore the bearing 31 does not have to cater for high rotational speeds, and a large diameter bearing can therefore be used with the advantages set out above.

The free turbine 20 consists of three rows 40, 41, 42 of rotor blades arranged within the duct portion 15. The rotor blades of the rows 40, 41, 42 extend axially from opposite sides of central ring members 43, 44, 45, each of the central ring members 43, 44, 45 being a solid, non-tubular metal member which is arranged coaxially of the gas generator 2 and thus parallel to the shaft 22.

The central ring member 43 is connected to the structure 23 to drive the latter and to drive the shaft 22. The central ring member 43 is not provided with any bearings and is in fact supported solely by its connection, via the structure 23, to the shaft 22. The central ring members 44, 45 are also not supported by any bearing structure, the central ring members 43, 44, 45 being interconnected. The interconnection between the central ring members 43–45 forms a solid disc-like metal member 48 which is disposed in a plane substantially perpendicular to the axis of the shaft 22.

As will be appreciated, the loads due to centrifugal forces and the gas loads on the upper portions of the blades of the rows 40–42 will tend to twist the latter about their central ring members 43–45 so as to impart a counterclockwise torque thereto. This counterclockwise torque will, however, be substantially balanced by a clockwise torque which will be imparted by reason of the loads due to centrifugal forces and the gas loads acting on the lower portions of the blades of the rows 40–42. Thus the provision of central ring members 43–45, as opposed to the alternative of providing connections between the rows 40–42 at either their upper or lower ends, tends to compensate for the effect of the said centrifugal and gas loads. Furthermore, by reason of this balancing-out of forces, it is possible to provide a lighter mounting for the rows 40–42 than would otherwise be possible. This is because if rings were mounted at either of the extremities of the rotor blades they would experience a torque in one sense only and would have to be made sufficiently strong to withstand this torque.

Mounted within the duct portion 15 is a fairing 46 which is disposed on the upstream side of the free turbine 20, while a fairing 47, which is disposed in the duct portion 16, is arranged on the downstream side of the free turbine 20. The fairing 46 both helps to guide the fluid flow smoothly through the duct portion 15 and also helps to guide the fluid onto the blades of the rows 40–42 so as to diminish the effect of the obstruction caused by the central ring members 43–45. The fairing 47 similarly guides the fluid leaving the row 42 so as to turn this fluid through substantially 90° and so to diminish the effect of the obstruction caused by the central ring member 45.

If desired, the fairings 46, 47 may carry sound damping material (generally indicated by hatch lines in the drawing).

We claim:

1. A fluid flow machine having a substantially cylindrical fixed outer casing, a substantially axially extending rotatable shaft which is disposed within and spaced from the fixed outer casing, first bearing means within which the shaft is mounted and supported, substantially radially extending struts secured to the outer casing and carrying the first bearing means, second bearing means mounted within the shaft, a device which is mounted and supported within said second bearing means, said device causing relative rotation between the shaft and the said device, and means connected to the outer casing for preventing rotation of the said device.

2. A fluid flow machine as claimed in claim 1 in which the means for preventing rotation are connected to the outer casing by being connected to the said struts.

3. A fluid flow machine as claimed in claim 1 in which the said device is constituted by a gas turbine device which drives the said shaft.

4. A fluid flow machine as claimed in claim 3 in which the said outer casing forms the outer casing of a fan duct, there being mounted within the fan duct a fan which is driven by the said shaft.

5. A fluid flow machine as claimed in claim 4 in which the gas turbine device comprises a radially arranged turbine which drives the said shaft.

6. A fluid flow machine as claimed in claim 5 in which the radially arranged turbine is a free turbine, the gas turbine device comprising a gas generator whose gases drive the free turbine.

7. A fluid flow machine as claimed in claim 3 in which the means for preventing rotation comprise interengaging dogs which are respectively provided on a part of the gas turbine device and on means connected to said struts.

8. A fluid flow machine as claimed in claim 5 in which the means connected to the struts comprise the stator part of the said radially arranged turbine.

9. A fluid flow machine as claimed in claim 8 in which the free turbine comprises a row of rotor blades which extend axially to opposite sides of a central ring member which is arranged coaxially of the gas generator, the central ring member having a drive connection to the said shaft to drive the latter and being supported solely thereby.

10. A fluid flow machine as claimed in claim 9 in which there is at least one further row of rotor blades, the blades of each said row extending from a central ring member respectively, the central ring members of said rows being interconnected.

11. A fluid flow machine as claimed in claim 9 in which the said drive connection is a radially flexible connection.

12. A fluid flow machine as claimed in claim 11 in which the flexible connection is a "hairpin" connection.

13. A fluid flow machine as claimed in claim 10 in which fairings are mounted on opposite sides respectively of the said rows, the fairings guiding fluid through the gas turbine device onto or from the blades so as to diminish the effect of the obstruction caused by the central ring members.

14. A fluid flow machine as claimed in claim 13 in which the fairings carry sound damping material.

15. A fluid flow machine as claimed in claim 13 in which at least one of the fairings extends through a curved duct portion of the gas turbine device and helps to guide the fluid smoothly therethrough.

References Cited

UNITED STATES PATENTS

| | | | |
|---|---|---|---|
| 2,360,130 | 10/1944 | Heppner | 60—268 |
| 2,430,399 | 11/1947 | Heppner | 60—268 |
| 2,526,409 | 10/1950 | Price | 60—226 |
| 2,704,645 | 3/1955 | Colvin | 60—39.31 |
| 3,332,241 | 7/1967 | Coplin | 60—226 |

DOUGLAS HART, Primary Examiner

U.S. Cl. X.R.

60—39.16, 269; 415—170